(12) United States Patent
Smith

(10) Patent No.: US 9,402,347 B2
(45) Date of Patent: Aug. 2, 2016

(54) BALER REAR SHIELD MECHANISM

(71) Applicant: CNH AMERICA LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 567 days.

(21) Appl. No.: 13/796,319

(22) Filed: Mar. 12, 2013

(65) Prior Publication Data

US 2014/0261022 A1  Sep. 18, 2014

(51) Int. Cl.
*A01F 15/08* (2006.01)
*A01F 15/07* (2006.01)

(52) U.S. Cl.
CPC ............. *A01F 15/0883* (2013.01); *A01F 15/07* (2013.01); *A01F 15/0875* (2013.01)

(58) Field of Classification Search
CPC . A01F 15/0883; A01F 15/07; A01F 15/0875; A01F 15/08
USPC .............................. 100/87, 88, 188 R; 56/341
See application file for complete search history.

(56) References Cited

U.S. PATENT DOCUMENTS

| | | | |
|---|---|---|---|
| 3,931,702 A | 1/1976 | Soteropulos et al. | |
| 4,257,219 A | 3/1981 | Burrough et al. | |
| 4,517,891 A | 5/1985 | Henry | |
| 6,463,714 B2 | 10/2002 | Viaud | |
| 6,672,205 B2 | 1/2004 | Viaud | |
| 6,745,680 B2 * | 6/2004 | Viaud | A01F 15/07 100/88 |
| 6,941,740 B2 | 9/2005 | Fox et al. | |
| 6,994,020 B2 | 2/2006 | Viaud | |
| 7,055,425 B2 * | 6/2006 | Viaud | A01F 15/07 100/100 |
| 7,140,294 B1 * | 11/2006 | Anstey | A01F 15/0883 100/87 |
| 7,380,496 B2 * | 6/2008 | Viaud | A01F 15/0833 100/87 |
| 2012/0204739 A1 | 8/2012 | Beaufort | |
| 2013/0133530 A1 | 5/2013 | Roberge et al. | |

FOREIGN PATENT DOCUMENTS

WO    WO 2014194287 A2 *  12/2014  .......... A01F 15/0883

* cited by examiner

*Primary Examiner* — Alexander P Taousakis
*Assistant Examiner* — Leonel Vasquez
(74) *Attorney, Agent, or Firm* — Patrick M. Sheldrake

(57) ABSTRACT

A gate assembly for use with a baler that includes a belt guide mechanism coupled to a side of the baler frame and guide one or more belts used to form the bale. The gate assembly also includes a shield pivotably coupled to the side of the baler frame and configured to limit contact with one or more components of the baler. The gate assembly further includes a linkage assembly coupled between the belt guide mechanism and the shield. The belt guide mechanism is configured to pivot between a lower belt guide mechanism position and a raised belt guide mechanism position to allow the bale to be ejected from the bale chamber. The linkage assembly is configured to pivot the shield between a lower shield position and a raised shield position responsive to the pivoting of the belt guide mechanism.

16 Claims, 12 Drawing Sheets

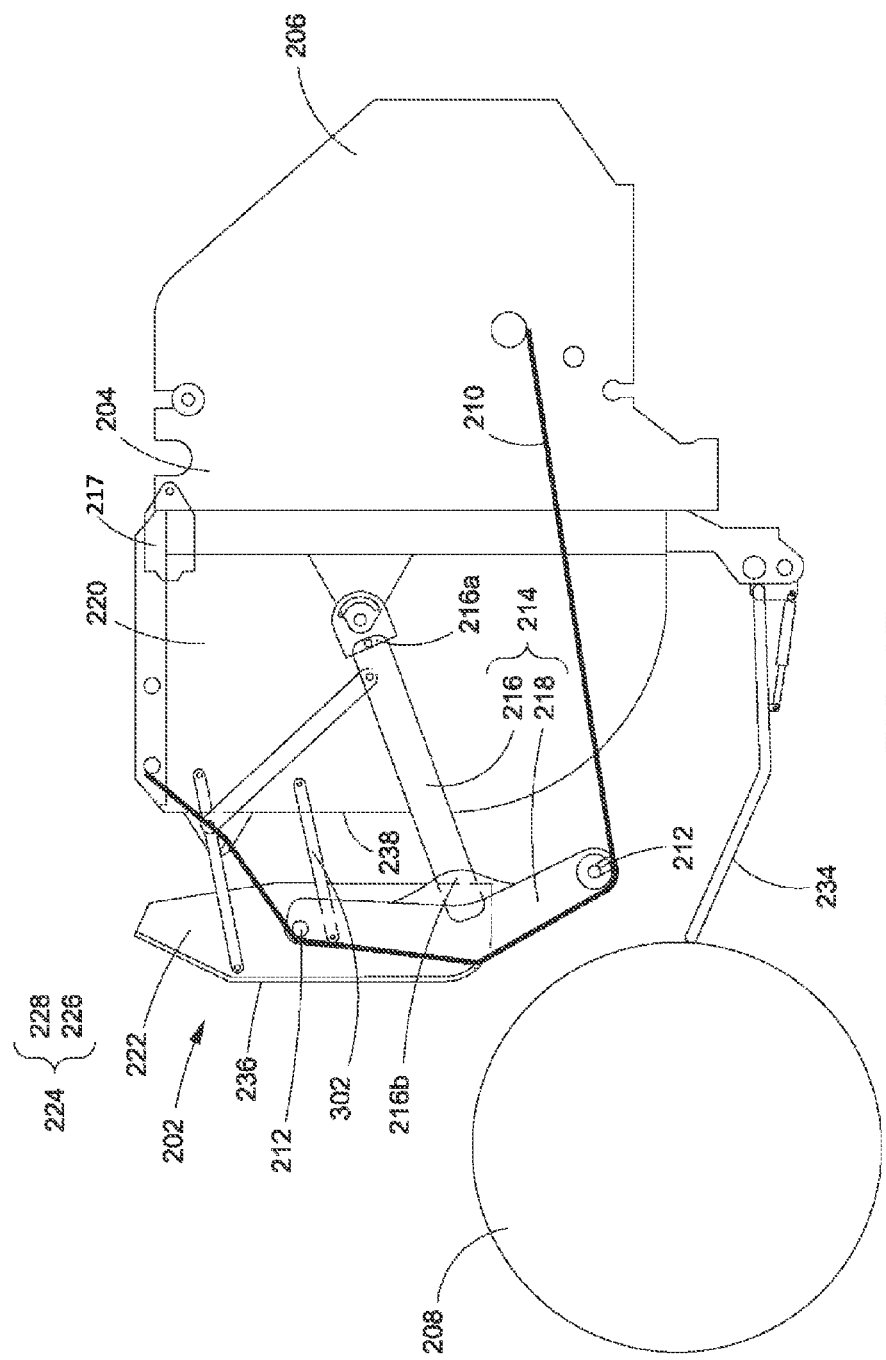

BALER REAR SHIELD MECHANISM

TECHNOLOGY FIELD

The present disclosure relates generally to ejection of bales in a baler, and particularly to a rear shield mechanism to facilitate ejection of bales in a baler.

BACKGROUND

Agricultural balers have been used to consolidate and package crop material to facilitate the storage and handling of the crop material for later use. Typically, a mower-conditioner cuts and conditions the crop material for windrow drying in the sun. When the cut crop material is properly dried, a baler, for example a round baler, the most frequently used in industry, travels along the windrows to pick up the crop material and form the material into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by net wrapping or other wrapping such as plastic wrapping and wire. After the round bale is wrapped, the back of the baler, or tailgate assembly, opens and the wrapped bale is discharged.

Some conventional balers include tailgate assemblies having sidewalls, rolls to secure belts which go around the bale, a belt guide mechanism to connect the rolls and a rear shield coupled to the sidewalls to prevent the operator from contacting the moving belts and other moving parts during operation. The belt guide mechanism in these conventional tailgate assemblies rises up to allow the bale to be ejected from the chamber. The sidewalls and the rear shield that is coupled to the sidewalls are also raised up with the belt guide mechanism to continue to prevent the operator from contacting the moving belts during operation while the belt guide mechanism is raised. In these conventional balers, however, the sidewalls of the tailgate are fixed to the baler mainframe and do not raise up with the belt guide mechanism and the rolls to allow the bale to be ejected from the baler. In other conventional balers, the belt guide mechanism is coupled directly to the baler frame. In these conventional balers, the baler frame does not rise up with the belt guide mechanism and the rolls to allow the bale to be ejected from the baler.

Accordingly, an improved method and system for raising the rear shield with the belt guide mechanism is needed.

SUMMARY

Embodiments of the present invention are directed to a baler that includes a baler frame, a bale chamber configured to form a bale from bale material and a gate assembly. The gate assembly includes a belt guide mechanism coupled to a side of the baler frame and configured to guide one or more belts used to form the bale. The gate assembly also includes a shield pivotably coupled to the side of the baler frame and configured to limit contact with one or more components of the baler. The gate assembly further includes a linkage assembly coupled between the belt guide mechanism and the shield. The belt guide mechanism is configured to pivot between a lower belt guide mechanism position and a raised belt guide mechanism position to allow the bale to be ejected from the bale chamber. The linkage assembly is configured to pivot the shield between a lower shield position and a raised shield position responsive to the pivoting of the belt guide mechanism.

According to one embodiment, the linkage assembly includes a shield support arm coupled between the shield and the baler frame and a linkage arm coupled between the shield support arm and the belt guide mechanism.

According to another embodiment, the gate assembly further includes a second linkage arm coupled between the shield and the baler frame and spaced from the linkage arm, and the second linkage arm is configured to prevent the shield from contacting the bale when the shield is pivoted.

In one aspect of an embodiment, the linkage assembly is configured to prevent the shield from contacting the bale when the shield is pivoted.

In one embodiment, the gate assembly further includes a cam track disposed on a surface of the shield and one or more cams disposed on a surface of the belt guide mechanism and configured to move along the cam track. The cams, the cam track and the linkage assembly are together configured to prevent the shield from contacting the bale when the shield is pivoted.

In another embodiment, the shield includes a surface facing a rear surface of the baler frame, and the cams, the cam track and the linkage assembly are together configured to cause the surface of the shield facing the ejected bale to be substantially parallel to the rear surface of the baler frame when the shield is in a position between the raised position and the lowered position and proximate to the bale.

According to one embodiment, the gate assembly further includes an opposing belt guide mechanism spaced from the belt guide mechanism and rotatably coupled to an opposing side of the baler frame and an opposing linkage assembly coupled between the opposing belt guide mechanism and an opposing side of the shield. The belt guide mechanism and the opposing belt guide mechanism are configured to pivot between respective lower belt guide mechanism positions and respective raised belt guide mechanism positions to allow the bale to exit the bale chamber. The linkage assembly and the opposing linkage assembly are configured to pivot the shield between the lower shield position and the raised shield position responsive to the pivoting of the belt guide mechanism and the opposing belt guide mechanism.

According to another embodiment, the baler further includes one or more rotatable belt rolls coupled between the belt guide mechanism and the opposing belt guide mechanism. The linkage assembly and the opposing linkage assembly are configured to cause the shield to limit operator contact of the one or more belts and the one or more belt rolls when the shield is pivoted between the lower shield position and the raised shield position.

In one embodiment, the gate assembly further includes a sidewall fixed to the baler frame. The belt guide mechanism and the shield are pivotably coupled to the sidewall and the linkage assembly is coupled between the belt guide mechanism and the shield.

Embodiments of the present invention are directed to a gate assembly for use with a baler. The gate assembly includes a belt guide mechanism coupled to a side of the baler frame and guide one or more belts used to form the bale and a shield pivotably coupled to the side of the baler frame and configured to limit contact with one or more components of the baler. The gate assembly also includes a linkage assembly coupled between the belt guide mechanism and the shield. The belt guide mechanism is configured to pivot between a lower belt guide mechanism position and a raised belt guide mechanism position to allow the bale to be ejected from the bale chamber. The linkage assembly is configured to pivot the shield between a lower shield position and a raised shield position responsive to the pivoting of the belt guide mechanism.

According to one embodiment, the linkage assembly includes a shield support arm coupled between the shield and the baler frame and a linkage arm coupled between the shield support arm and the belt guide mechanism.

According to another embodiment, the gate assembly further includes a second linkage arm coupled between the shield and the baler frame and spaced from the linkage arm, and the second linkage arm is configured to prevent the shield from contacting the bale when the shield is pivoted.

In one aspect of an embodiment, the linkage assembly is configured to prevent the shield from contacting the bale when the shield is pivoted.

In one embodiment, the belt guide mechanism includes a belt guide arm extending from a pivoting end to a distal end and a belt roll holding portion extending in opposing directions from the distal end of the belt guide arm.

In another embodiment, the gate assembly includes a cam track disposed on a surface of the shield and one or more cams disposed on a surface of the belt roll holding portion and configured to move along the cam track. The cams, the cam track and the linkage assembly are together configured to prevent the shield from contacting the bale when the shield is pivoted.

According to an embodiment, the shield includes a surface facing a rear surface of the baler frame. The cams, the cam track and the linkage assembly are together configured to cause the surface of the shield facing the ejected bale to be substantially parallel to the rear surface of the baler frame when the shield is in a position between the raised position and the lowered position and proximate to the bale.

According to another embodiment, the gate assembly further includes a sidewall fixed to the baler frame, the belt guide mechanism and the shield are pivotably coupled to the sidewall and the linkage assembly is coupled between the belt guide mechanism and the shield.

In one embodiment, the gate assembly further includes an opposing sidewall spaced from the sidewall and fixed to the baler frame and an opposing belt guide mechanism spaced from the belt guide mechanism and pivotably coupled to the opposing sidewall. The gate assembly further includes an opposing linkage assembly coupled between the opposing belt guide mechanism and an opposing side of the shield. The belt guide mechanism and the opposing belt guide mechanism are configured to pivot between respective lower belt guide mechanism positions and respective raised belt guide mechanism positions to allow the bale to be ejected from the bale chamber. The linkage assembly and the opposing linkage assembly are configured to pivot the shield between the lower shield position and the raised shield position responsive to the pivoting of the belt guide mechanism and the opposing belt guide mechanism.

Embodiments of the present invention are directed to a method of operating a tailgate assembly in a baler that includes using belts coupled to a belt guide mechanism to form a bale in a bale chamber and ejecting the bale from the bale chamber. The method also includes pivoting the belt guide mechanism between a lower belt guide mechanism position and a raised belt guide mechanism position to allow the bale to exit the bale chamber. The method further includes using a linkage assembly coupled between the belt guide mechanism and a shield to pivot the shield between a lower shield position and a raised shield position.

According to an embodiment of the invention pivoting the shield further includes preventing the shield from contacting the bale ejected from the bale chamber.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3A through FIG. 3E are cross sectional view of a portion of a baler illustrating an exemplary gate assembly with a linkage assembly and a second linkage arm during different states of operation for use with embodiments of the present invention.

DETAILED DESCRIPTION OF ILLUSTRATIVE EMBODIMENTS

Figure 1:
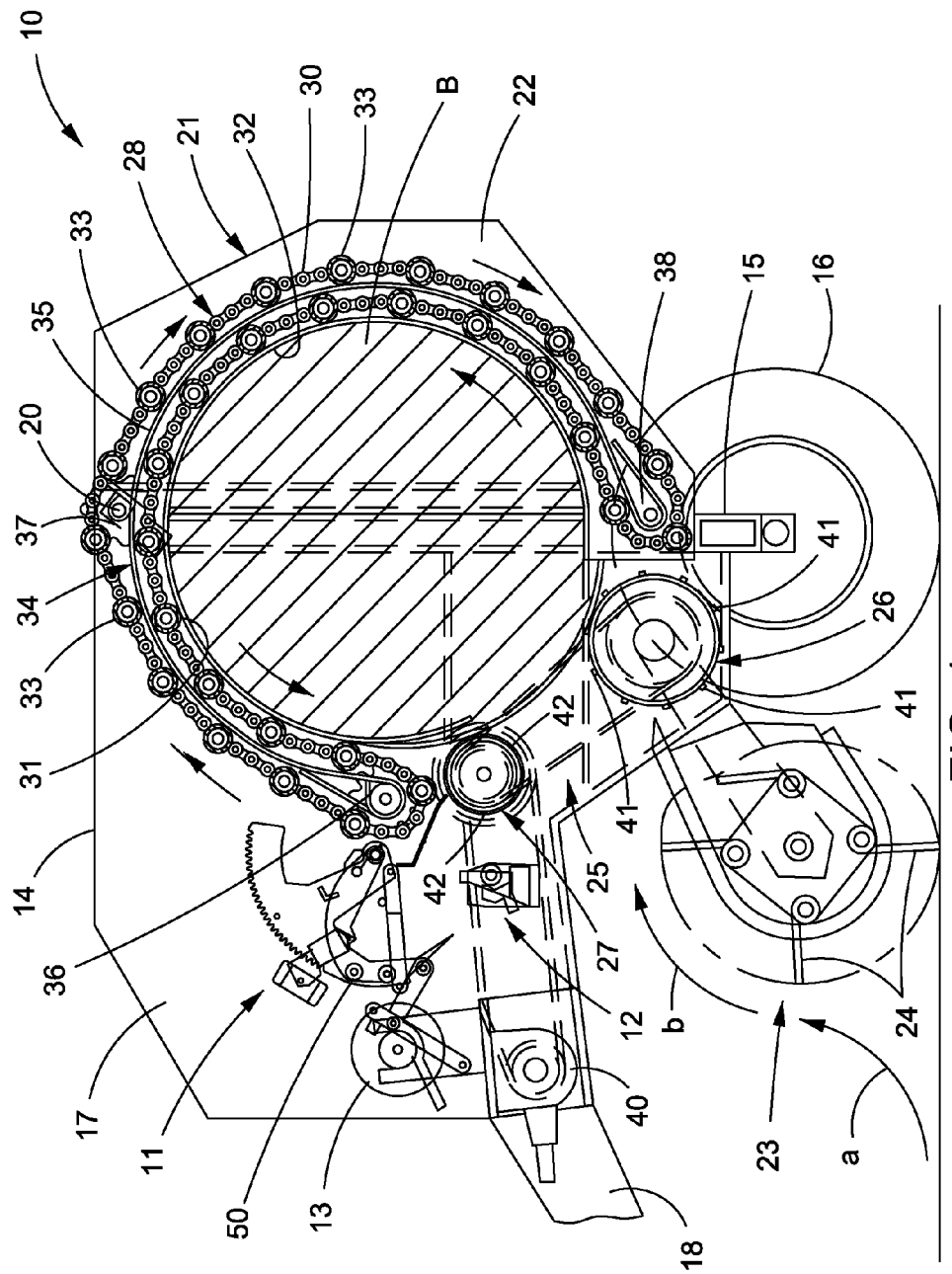
FIG. 1 illustrates an exemplary round baler for use with embodiments of the present invention.

Embodiments of the present invention provide an improved system and method for raising a rear shield 222 of a baler gate assembly 202. Embodiments provide a linkage assembly 214 to pivot a belt guide mechanism and a shield 222 between respective lowered and raised positions to allow a bale 208 to be formed in a bale chamber 204 and exit the bale chamber 204. Embodiments provide a cam track 230 and cams 232 to move along the cam track 230 and guide and/or support the movement of the shield 222 when the linkage assembly 214 is pivoted. Embodiments provide a second linkage arm 302 configured to guide and/or support the movement of the shield 222 when the linkage assembly 214 is pivoted. Embodiments limit or prevent the shield 222 from contacting the bale 208 when the shield 222 is pivoted while limiting operator contact with moving components such as belts 210 and belt rolls 212 in the baler.

Embodiments of the present invention are particularly well suited for, but in no way limited to, use with agricultural balers, for example, such as round balers. Agricultural balers, such as round balers, are well known in the agricultural industry, and the instant invention can be used with substantially any of such machines.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown). FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net wrapping, fed from a net roll 13 through a net feeding assembly 50.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31 and 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2A:
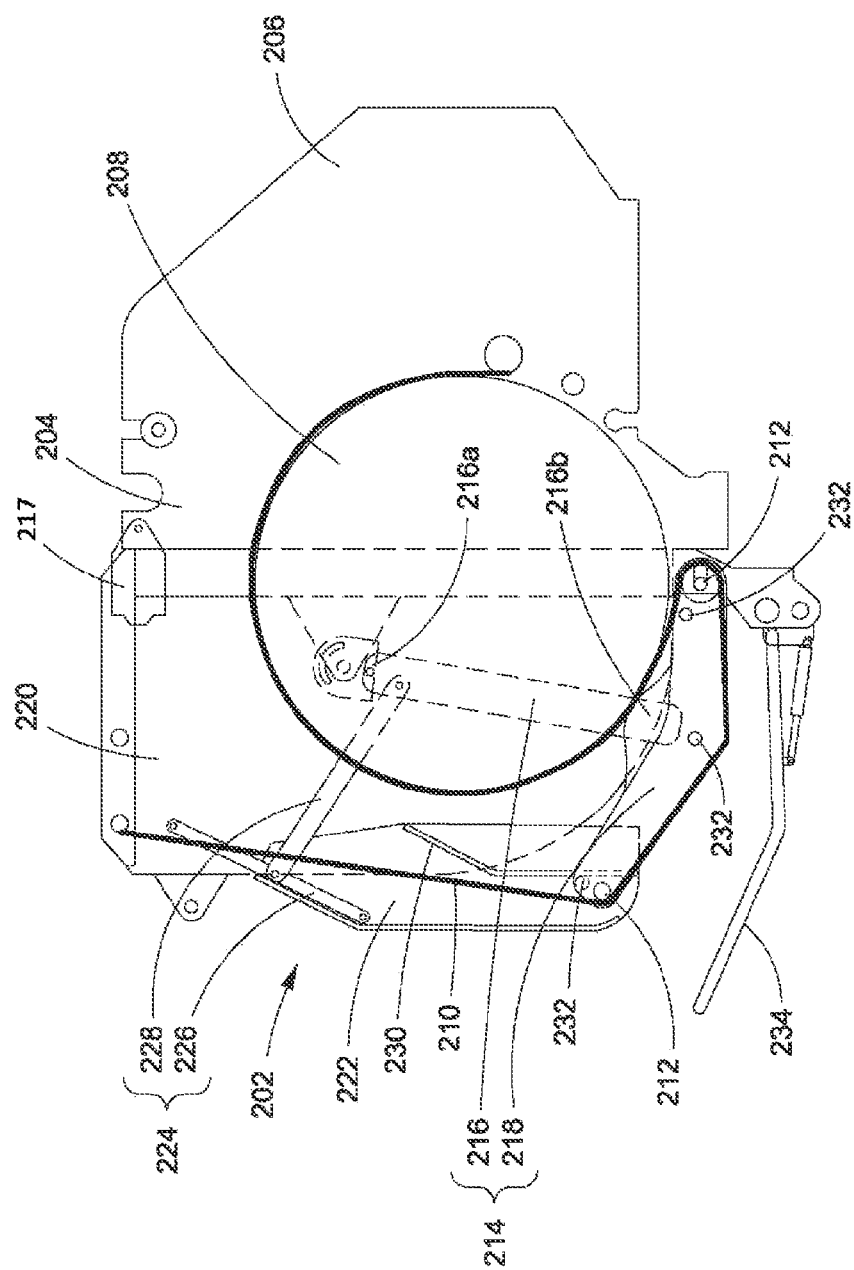
FIG. 2A through FIG. 2E are cross sectional views of a portion of a baler illustrating an exemplary gate assembly with a linkage assembly, cams and a cam track during different states of operation for use with embodiments of the present invention.

FIG. 2A through FIG. 2E are cross sectional views of a portion of a baler, such as baler 10 (shown at FIG. 1), illustrating an exemplary gate assembly 202 during different states of operation. As shown in FIG. 2A, the baler may include gate assembly 202, bale chamber 204 and baler frame 206. As shown at FIG. 2A, bale chamber 204 may include bale 208 that has been formed from bale material. The bale 208 may be formed in bale chamber 204 using one or more belts, such as belt 210, which may traverse the path shown in FIG. 2A around rolls 212. The gate assembly 202 may include a side wall 220 fixed to the baler frame 206. The side wall 220 may be fixed to the baler frame 206 via a fixed coupling device 217. In some embodiments, side walls may be fixed to baler frames using other types of fixed coupling devices. In other embodiments, side walls may be unitarily formed with baler frames.

As shown at FIG. 2A, gate assembly 202 may also include a belt guide mechanism 214 pivotably coupled to the baler frame 206 via sidewall 220 and coupled to the rolls 212 used to guide the belts 210. As shown in the embodiment at FIG. 2A, belt guide mechanism 214 may include a belt guide arm 216 extending from a pivoting end 216a to a distal end 216b and a belt roll holding portion 218 extending in opposing directions from the distal end 216b of the belt guide arm 216. The rolls 212 may be coupled to the belt guide mechanism 214 at opposing ends of belt roll holding portion 218. Although the embodiment at FIG. 2A shows two rolls 212 coupled to the belt roll holding portion 218, other embodiments may include any number of rolls coupled to belt guide mechanisms. In some embodiments, the belt guide mechanism 214 may be coupled directly to the baler frame 206 without being coupled to the sidewall 220. In these embodiments, sidewall 220 may move independent from the belt guide mechanism 214.

Gate assembly 202 may also include a shield 222 pivotably coupled to the baler frame 206 via sidewall 220. The size and shape of the shield 222 shown in the embodiment at FIG. 2A is configured to limit or prevent an operator (not shown) from contacting moving parts, such as belts 210 and rollers 212 during operation. The geometry of the shield 222 shown in the embodiment at FIG. 2A is merely exemplary. Other embodiments may include shields having different geometries configured to limit or prevent operators from contacting moving parts of balers. In some embodiments, the shield 222 may be coupled directly to the baler frame 206 without being coupled to the sidewall 220. In these embodiments, sidewall 220 may move independent from the shield 222.

Gate assembly 202 may also include a linkage assembly 224 coupled between the belt guide mechanism 214 and a side of the shield 222. As shown at FIG. 2A, linkage assembly 224 may include a shield support arm 226 coupled between the shield 222 and the sidewall 220 (or in some embodiments, between the shield 222 and the baler frame 206). Linkage assembly 224 may also include a linkage arm 228 coupled between the shield support arm 226 and the belt guide arm 216 of belt guide mechanism 214.

Figure 2B:
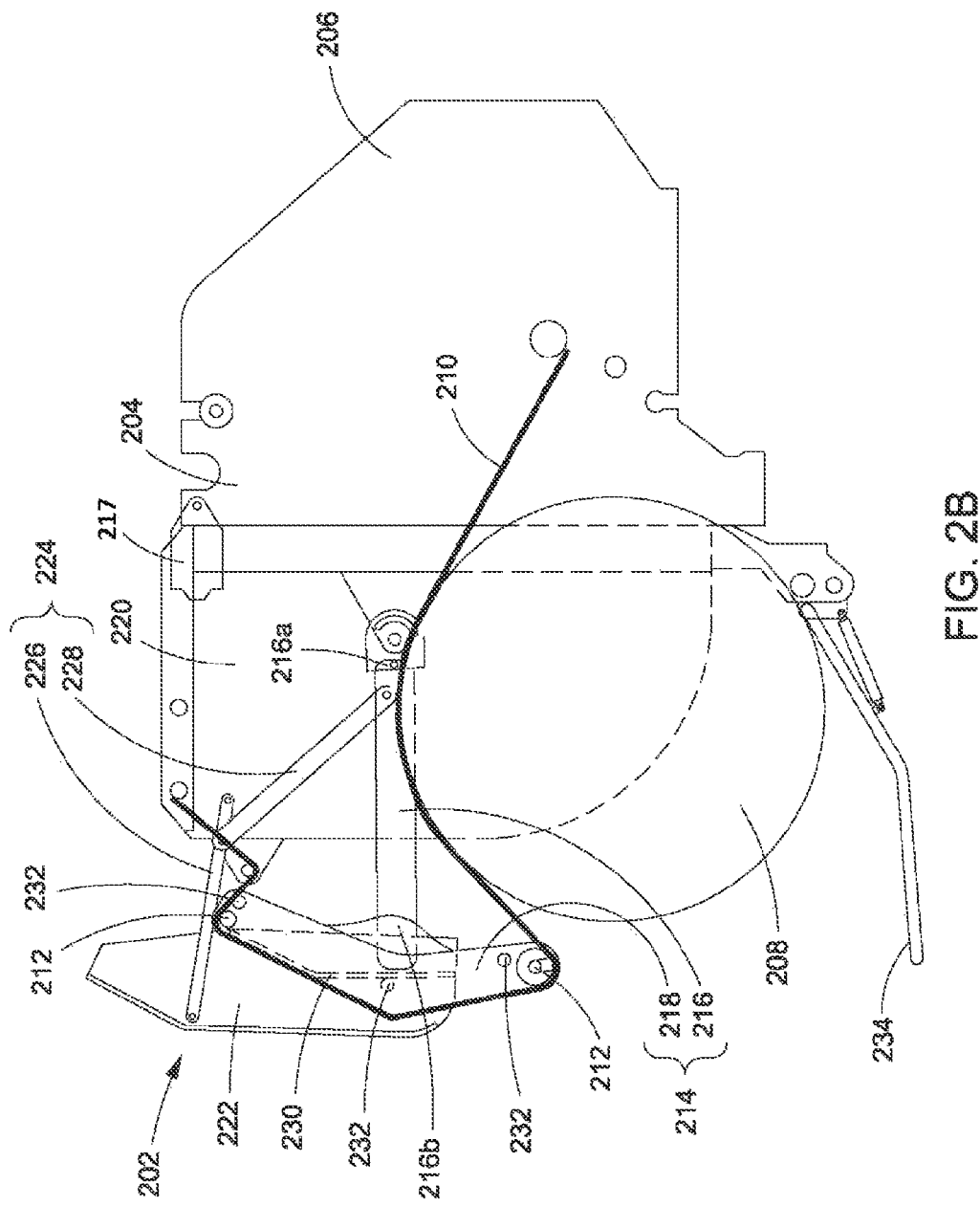

In some embodiments, as shown at FIG. 2A through FIG. 2B, gate assembly 202 may further include a cam track 230 disposed on a surface of the shield 222 and cams 232 disposed on a surface of the belt roll holding portion 218 and configured to move along the cam track 230. The geometry and location of the cam track shown in the embodiment at FIG. 2A through FIG. 2B is merely exemplary. Other embodiments may include cam tracks having different geometries and locations to cause the shield 222 to be in positions with respect to the different components of the gate assembly and the bale. The geometry of the cams 232, location of the cams 232 and the number of cams shown in the embodiment at FIG. 2A is merely exemplary. Embodiments may include cams having different geometries, cams having different locations and any number of cams. As shown at FIG. 2A through FIG. 2B, the cam track 230 may be angled. Embodiments may include cam tracks having any angles configured to cause the shield 222 to be in predetermined or desirable positions with respect to different components of the gate assembly 202 and the bale 208.

As described above, in some embodiments, the belt guide mechanism 214 and the shield 222 may be pivotably coupled to baler frame 206 via the sidewall 220. In other embodiments, however, the belt guide mechanism 214 and the shield 222 may be pivotably coupled directly to the baler frame 206. For simplicity, in the embodiments described below, the belt guide mechanism 214 and the shield 222 are pivotably coupled to baler frame 206 via the sidewall 220.

Because the sidewall 220 of the gate assembly 202 is fixed to the baler frame 206, the sidewall 220 does not pivot with the belt guide mechanism 214 and the shield 222. As shown in the embodiments at FIG. 2A through FIG. 2B, however, the belt guide mechanism 214 moves with respect to the sidewall 220 to allow the bale 208 to be ejected. In some aspects, a hydraulic cylinder (not shown) may be coupled between the baler frame 206 and the belt guide mechanism 214 to cause the belt guide mechanism 214 to move. The cams 232, the cam track 230 and linkage assembly 224 are configured to move the shield 222 to allow the bale 208 to pass (e.g., provide clearance) without the shield 222 interfering (e.g., contacting) with the bale 208. As described in more detail below with regard to FIG. 2A through FIG. 2B, the cams 232, the cam track 230 and the linkage assembly 224 may together be configured to cause the shield 222 to be in predetermined or desirable positions with respect to different components of the gate assembly 202 and the bale 208.

The movement of components of a gate assembly 202 is now described with reference to FIG. 2A through FIG. 2E. According to the embodiments shown at FIG. 2A through FIG. 2E, the belt guide mechanism 214 may be configured to pivot between a lower belt guide mechanism position (shown at FIG. 2A) and a raised belt guide mechanism position (shown at FIGS. 2C and 2D) to allow the bale 208 to exit the bale chamber 204. Responsive to the pivoting of the belt guide mechanism 214, the linkage assembly 224 may also be configured to pivot the shield 222 between a lower shield position (shown at FIG. 2A) and a raised shield position (shown at FIGS. 2C and 2D).

For example, when bale 208 is in the position (e.g., newly formed) within the bale chamber 204 shown at FIG. 2A, belt guide mechanism 214 is in the lower belt guide mechanism position shown at FIG. 2A. In this lower belt guide mechanism position, the belts 210 may be guided along the belt path shown at FIG. 2A to facilitate the forming of the bale 208 in the bale chamber 204. Further, when belt guide mechanism 214 is in the lower belt guide mechanism position, shield 222 is in the lower shield position shown at FIG. 2A. In this lower shield position, the shield may limit or prevent operator contact with the belts 210 and the belt rolls 212.

As bale 208 begins to exit the bale chamber 204 and moves to the bale position on bale ramp 234 shown at FIG. 2B, belt guide mechanism 214 pivots upward from the lower belt guide mechanism position shown at FIG. 2A to an intermediate belt guide mechanism position shown at FIG. 2B to allow (e.g., provide clearance) the bale 208 to exit the bale chamber 204. As the belt guide mechanism 214 pivots to the intermediate position belt guide mechanism position shown at FIG. 2B, the movement of the belt guide arm 216 causes the linkage assembly 224 to pivot the shield 222 from the lower shield position shown at FIG. 2A to an intermediate shield position shown at FIG. 2B. Further, as the belt guide mechanism 214 pivots to the intermediate position belt guide mechanism position shown at FIG. 2B, cams 232 move along cam track 230 to position the shield 222 responsive to the pivoting of the belt guide mechanism 214. In the intermediate shield position shown at FIG. 2B, the shield 222 may continue to limit or prevent operator contact with the belts 210 and the belt rolls 212.

Figure 2C:
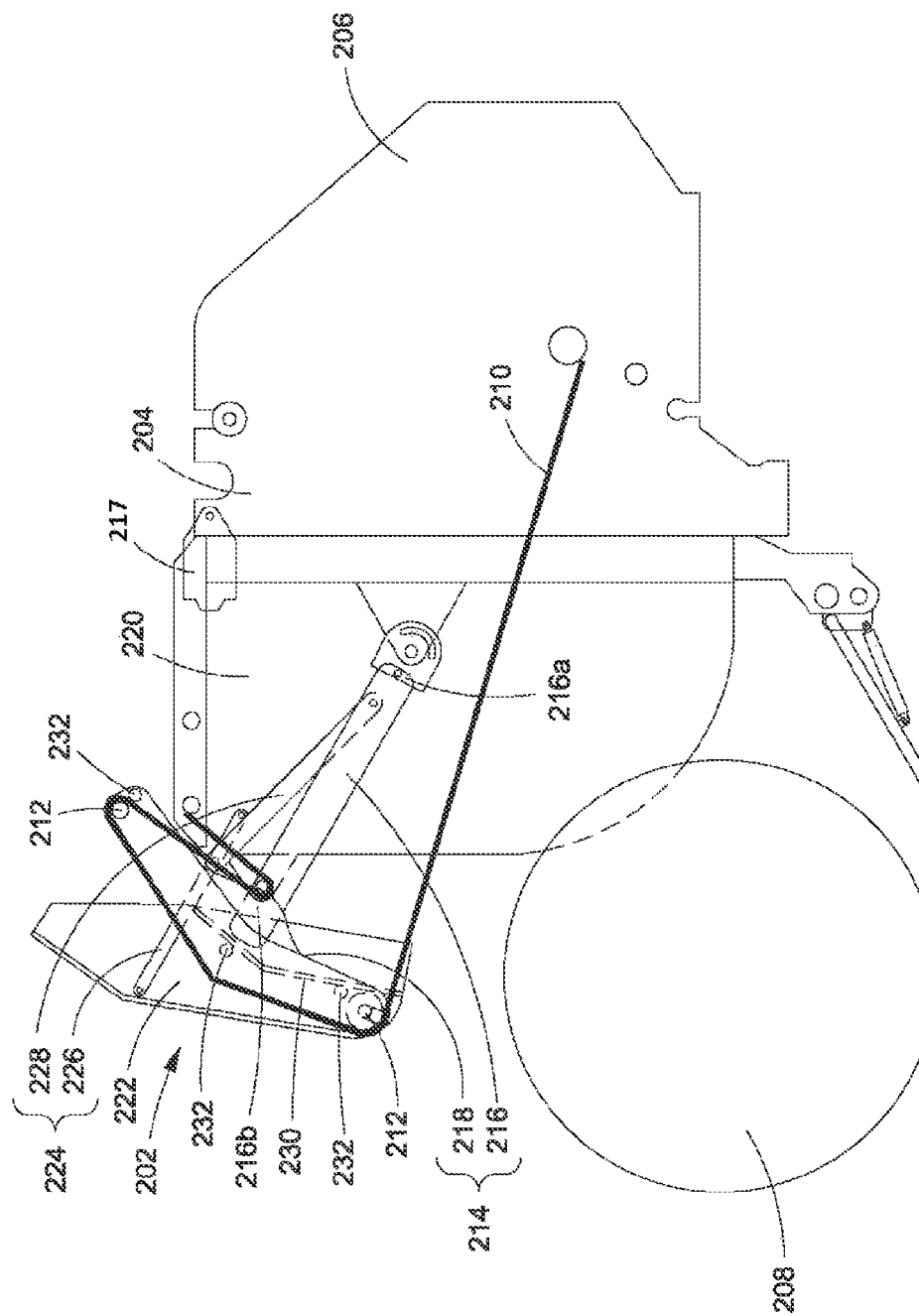

As bale 208 continues to exit the bale chamber 204 and moves to the bale position on bale ramp 234 shown at FIG. 2C, belt guide mechanism 214 pivots upward from the intermediate belt guide mechanism position shown at FIG. 2B to a raised belt guide mechanism position shown at FIG. 2C to allow (e.g., provide further clearance) the bale 208 to exit the bale chamber 204. As the belt guide mechanism 214 pivots to the raised belt guide mechanism position shown at FIG. 2C, the movement of the belt guide arm 216 causes the linkage assembly 224 to further pivot the shield 222 from the intermediate shield position shown at FIG. 2B to a raised shield position shown at FIG. 2C. Further, as the belt guide mechanism 214 pivots to the raised belt guide mechanism position shown at FIG. 2C, cams 232 move further along cam track 230 to guide and/or support the movement of the shield 222. In the raised shield position shown at FIG. 2C, the shield 222 continues to limit or prevent operator contact with the belts 210 and the belt rolls 212.

Figure 2D:
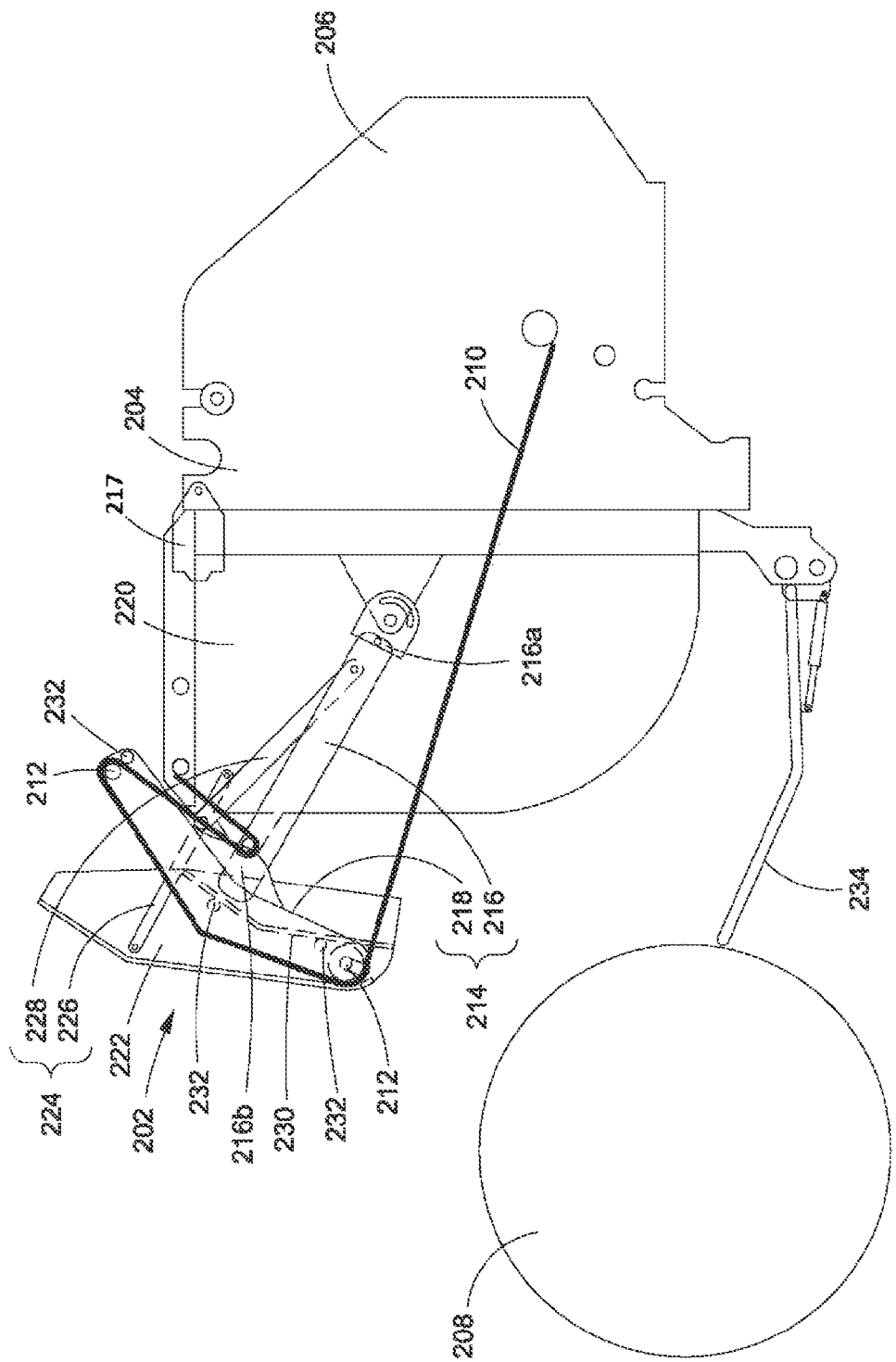

When belt guide mechanism 214 is in the raised belt guide mechanism and the shield 222 is in the raised shield position, bale 208 may be provided with sufficient clearance to move off of bale ramp 234 and come to rest proximate to bale ramp 234 at the bale position shown at FIG. 2D. When bale 208 is in this bale position proximate to bale ramp 234, belt guide mechanism 214 may pivot downward from the raised belt guide mechanism position shown at FIG. 2D back to the intermediate belt guide mechanism position shown at FIG. 2E (and shown at FIG. 2B). As the belt guide mechanism 214 pivots to the intermediate belt guide mechanism position shown at FIG. 2E, the movement of the belt guide arm 216 causes the linkage assembly 224 to pivot the shield 222 downward from the intermediate shield position shown at FIG. 2D back to the intermediate shield position shown at FIG. 2E (and shown at FIG. 2B). Further, as the belt guide mechanism 214 pivots to the intermediate belt guide mechanism position shown at FIG. 2E, cams 232 move back along cam track 230 to guide and/or support the movement of the shield 222 with respect to the belt guide mechanism 214.

Figure 2E:
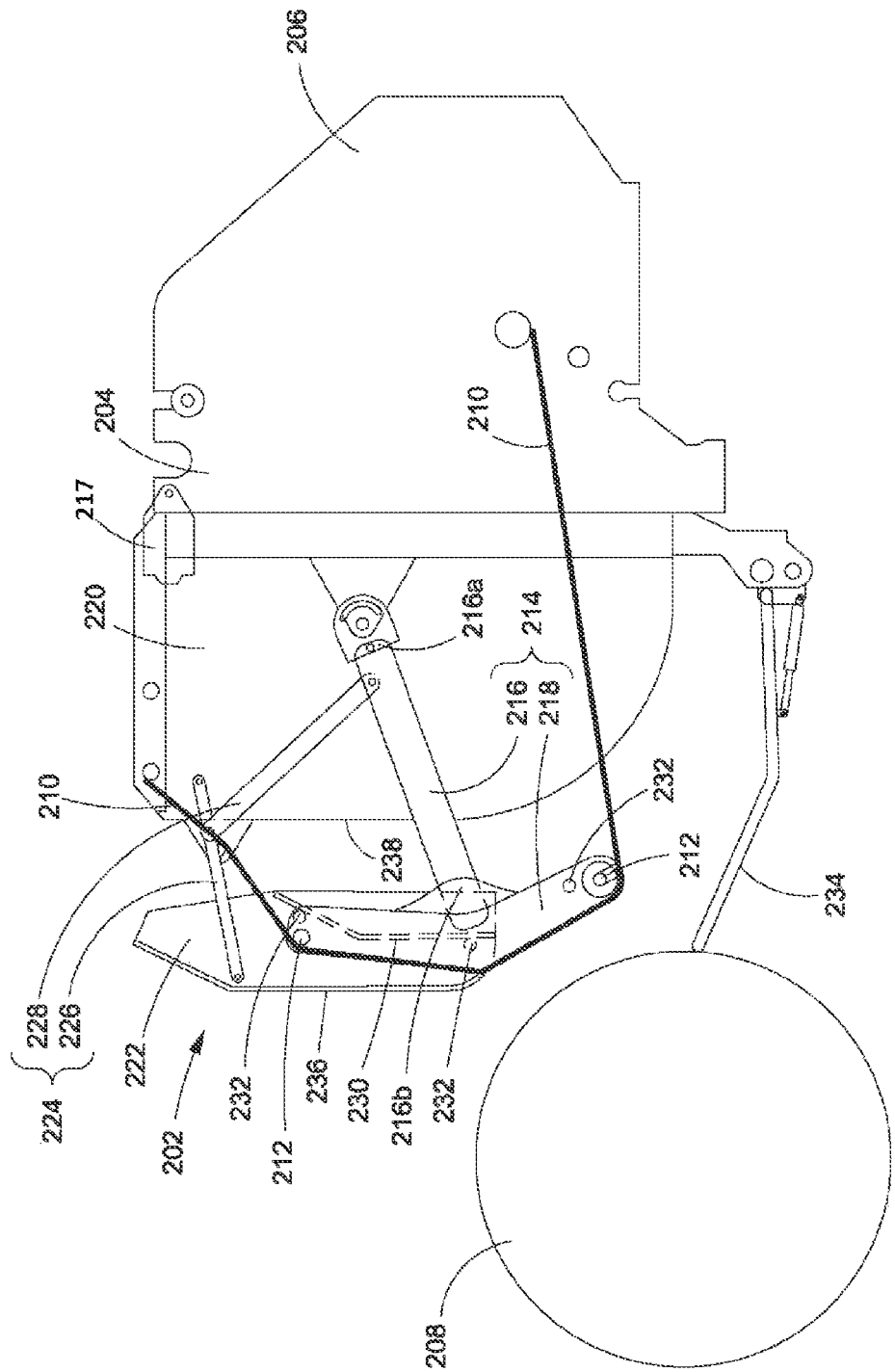

Because of the position of the bale 208 proximate to bale ramp 234 and proximate to the shield 222 as shown at FIG. 2E, the cams 232, the cam track 230 and the linkage assembly 224 are together configured to position the shield to prevent the shield 222 from contacting the bale 208. For example, in some embodiments, the cams 232, the cam track 230 and the linkage assembly 224 may together be configured to prevent the shield 222 from contacting the bale 208 when the shield is in the intermediate shown at FIG. 2E by causing rear surface 236 of the shield 222 to be substantially parallel to the rear surface 238 of the sidewall 220. In some embodiments, rear surface 236 of shield 222 may be caused to remain substantially parallel to the rear surface 238 of the sidewall 220 as the shield pivots between the raised position and the lowered position to prevent the shield 222 from contacting the bale 208 when the bale is in the position shown at FIG. 2E. In some aspects, as shown in the embodiment at FIG. 2A through FIG. 2E, the cam track 230 may be angled to prevent the shield 222 from contacting the bale 208 when the bale is in the position shown at FIG. 2E. Embodiments may include cam tracks having any angles configured to cause the shield 222 to prevent the shield 222 from contacting the bale 208.

The belt guide mechanism 214 may pivot from the intermediate belt guide mechanism position shown at FIG. 2E back to the lowered belt guide mechanism position shown at FIG. 2A. The movement of the belt guide arm 216 causes the linkage assembly 224 to further pivot the shield 222 from the intermediate shield position shown at FIG. 2E back to the lowered shield position shown at FIG. 2A. Further, as the belt guide mechanism 214 pivots to the lowered belt guide mechanism position shown at FIG. 2A, cams 232 move along cam track 230 to guide and/or support the movement of the shield 222 with respect to the belt guide mechanism 214. The next bale 208 may then be formed in the bale chamber 204 when the belt guide mechanism 214 is in the lowered belt guide mechanism position.

Figure 3A:
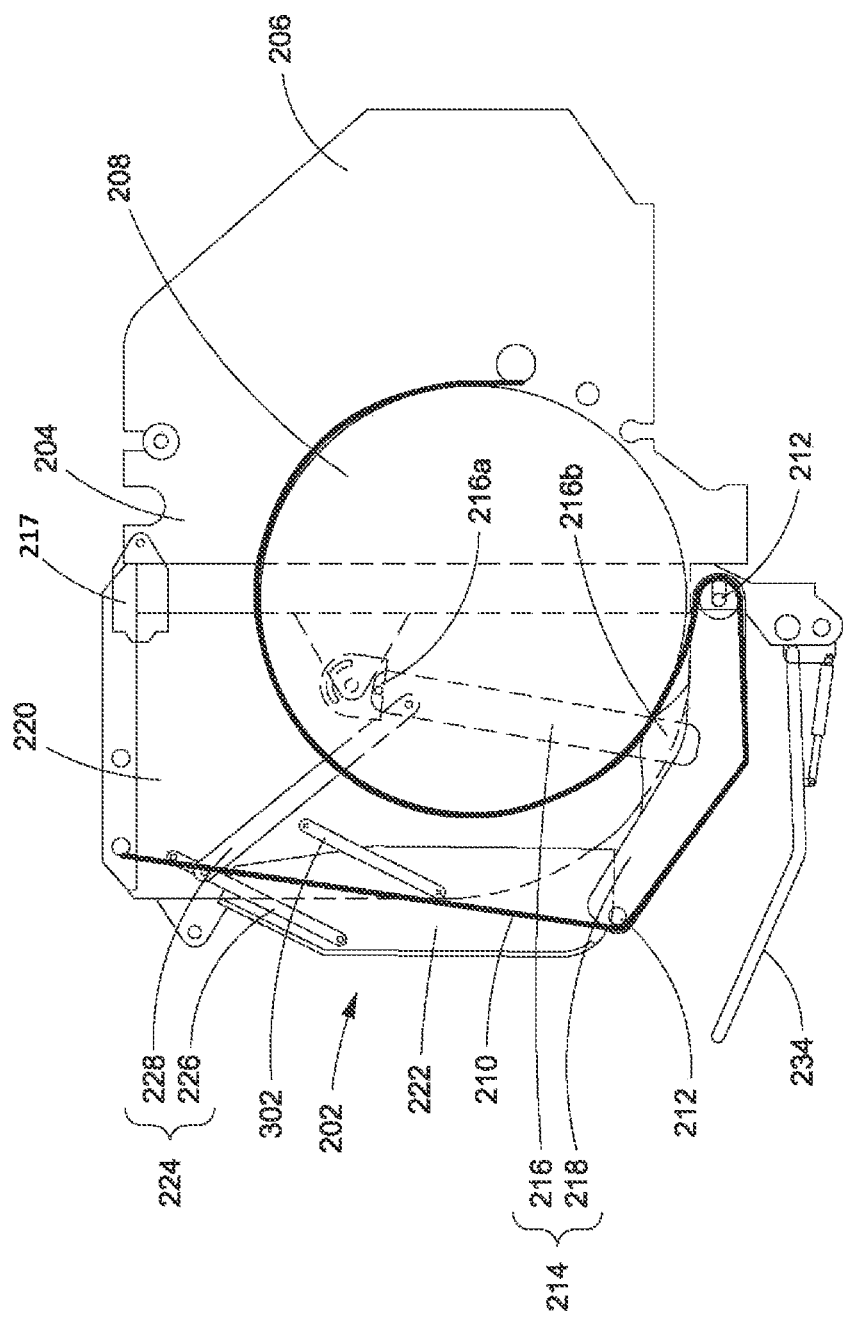
Figure 3B:
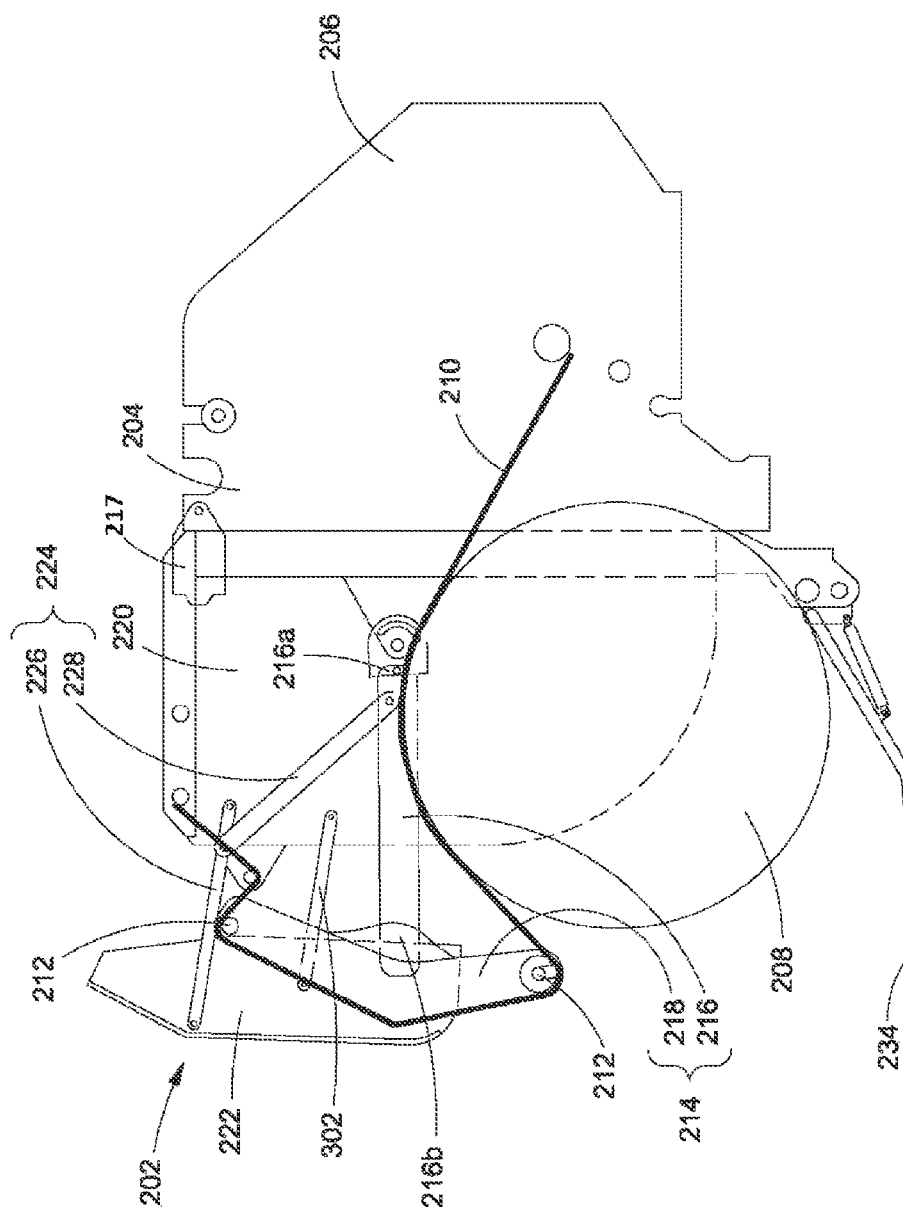
Figure 3C:
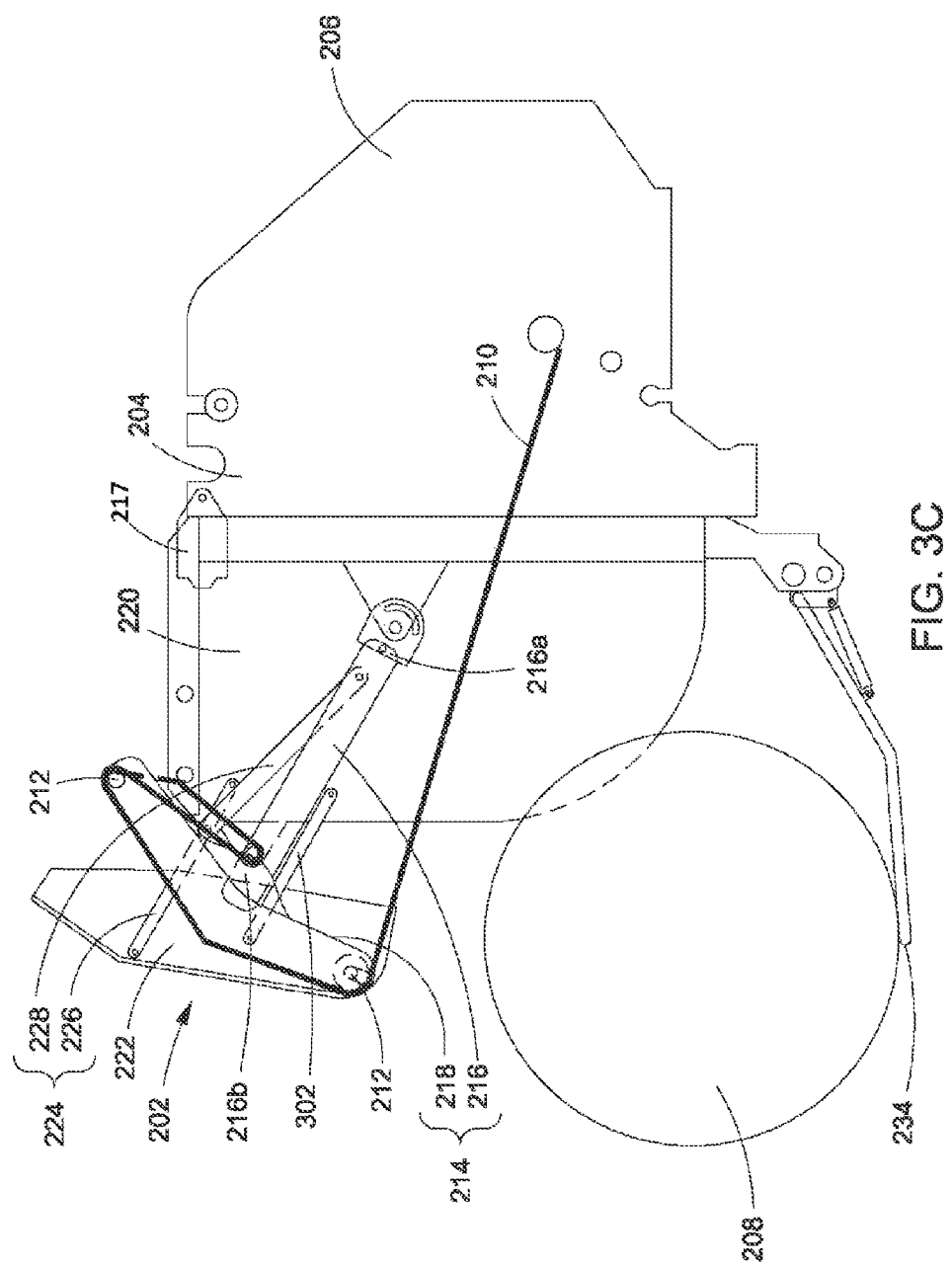
Figure 3D:
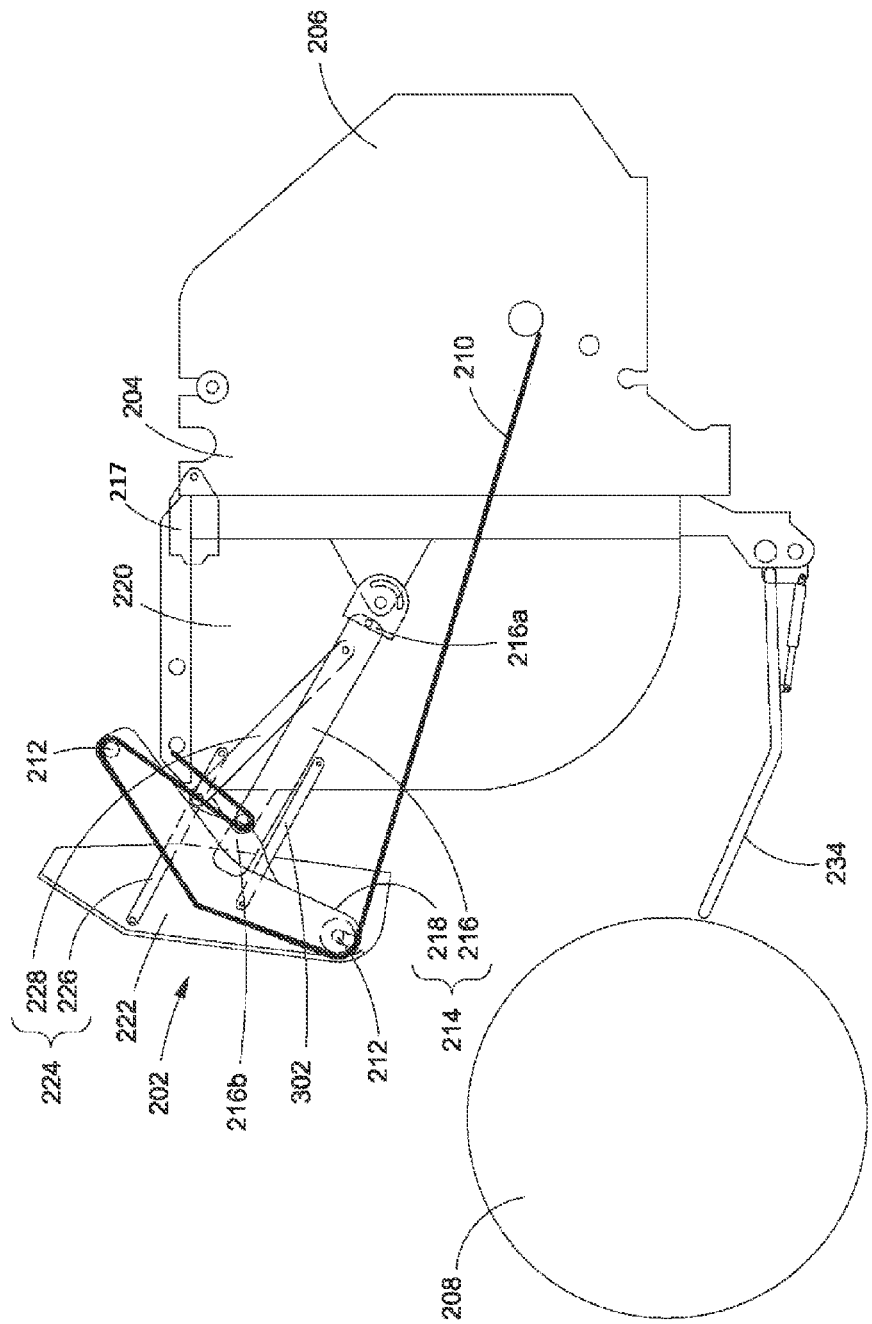

FIG. 3A through FIG. 3E are cross sectional views of a portion of a baler illustrating an exemplary gate assembly 202 with a linkage assembly 224 and a second linkage arm 302 during different states of operation. According to some embodiments, the cams 232 and the cam track 230 may be substituted with the second linkage arm 302. According to other embodiments, the cams 232 and the cam track 230 may be used in addition to the second linkage arm 302. As shown at FIG. 3A, second linkage arm 302 may be coupled between the shield 222 and the sidewall 220 and spaced from the linkage arm. In some embodiments, as shown at FIG. 3A through FIG. 3E, second linkage arm 302 may be configured to remain substantially parallel to the shield support arm 226 as the belt guide mechanism 214 and the shield 222 are pivoted between their respective lowered positions (shown at FIG. 3A) and raised positions (shown at FIG. 3E). In other embodiments, second linkage arm 302 may not remain substantially parallel to the shield support arm 226.

Similar to the cams 232 and cam track 230 shown at FIG. 2A through FIG. 2E, second linkage arm 302 may be configured and to guide and/or support the movement of the shield 222 as shown at FIG. 3A through FIG. 3E. In some embodiments, second linkage arm 302 may be configured to cause the shield 222 to be in predetermined or desirable positions with respect to different components of the gate assembly 202 and the bale 208. For example, as shown at FIG. 3E, the second linkage arm 302 and the linkage assembly 224 may be together configured to position the shield to prevent the shield 222 from contacting the bale 208 by causing rear surface 236 of the shield 222 to be substantially parallel to the rear surface 238 of the sidewall 220. In some embodiments, rear surface 236 of shield 222 may be caused to remain substantially parallel to the rear surface 238 of the sidewall 220 as the shield pivots between the raised position and the lowered position to prevent the shield 222 from contacting the bale 208 when the bale is in the position shown at FIG. 3E.

In some embodiments, the gate assembly 202 may also include another sidewall opposing sidewall 220, another belt guide mechanism 215 on an opposing side from belt guide mechanism 214 and another linkage assembly 225 on an opposing side from linkage assembly 224. For example, the opposing sidewall may be spaced from the sidewall 220 and fixed to the baler frame 206 on an opposing side of the baler 10. The opposing belt guide mechanism 215 may be spaced from the belt guide mechanism 224 and rotatably coupled to the opposing sidewall. The opposing linkage assembly 225 may be coupled between the opposing belt guide mechanism and an opposing side of the shield. Another shield arm opposing the shield support arm 226 may be rotatably coupled to the opposing sidewall.

The belt guide mechanism 214 and the opposing belt guide mechanism 215 may together be configured to pivot between respective lower belt guide mechanism positions and respective raised belt guide mechanism positions to allow the bale 208 to exit the bale chamber 204. The linkage assembly 224 and the opposing linkage assembly 225 may together be configured to pivot the shield 222 between the lower shield position and the raised shield position responsive to the pivoting of the belt guide mechanism 214 and the opposing belt guide mechanism 215. The rotatable belt rolls 212 may be coupled between the belt guide mechanism 214 and the opposing belt guide mechanism 215 and the linkage assembly 224 and the opposing linkage assembly 225 may be configured to cause the shield 222 to limit operator contact of the one or more belts, such as belt 210 and the belt rolls 212 when the shield 222 is pivoted between the lower shield position and the raised shield position.

Figure 4:
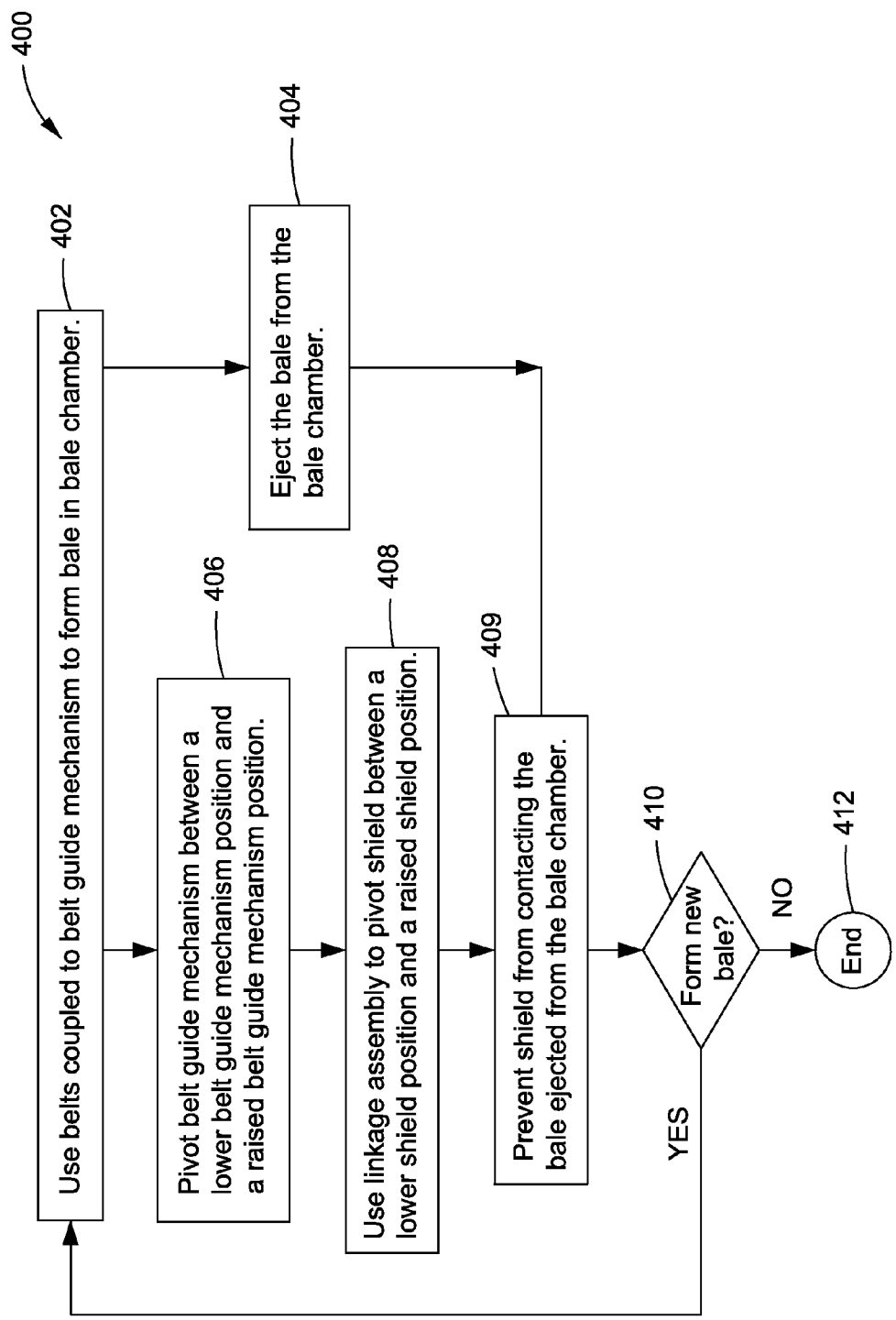
FIG. 4 is a flow chart illustrating an exemplary method of operating a gate assembly in a baler for use with embodiments of the present invention.

FIG. 4 is a flow chart illustrating a method 400 of operating a gate assembly in a baler. As shown at block 402, the method includes using one or more belts, such as belt 210, coupled to a belt guide mechanism 214 to form a bale 208 in a bale chamber 204. For example, when the belt guide mechanism 214 and the shield 222 are in their positions shown at FIG. 2A or FIG. 3A, one or more belts, such as belt 210, coupled to the belt guide mechanism 214 may facilitate the forming of the new bale 208 in the bale chamber 204.

As shown at block 404, the method includes ejecting the bale 208 from the bale chamber 204. For example, as shown at FIG. 2A through FIG. 3D, the bale 208 moves from its position in the bale chamber 204 shown at FIG. 2A and FIG. 3A to its position proximate to bale ramp 234 shown at FIG. 2D and FIG. 3D.

As shown at block 406, the method includes pivoting the belt guide mechanism 214 between a lower belt guide mechanism position and a raised belt guide mechanism position to allow the bale 208 to exit the bale chamber 204. For example, as shown at FIG. 2A through FIG. 2E and FIG. 3A through FIG. 3E, the belt guide mechanism 214 may pivot upward from its lower belt guide mechanism position shown at FIG. 2A and FIG. 3A to its intermediate belt guide mechanism position shown at FIG. 2B and FIG. 3B and to its raised belt guide mechanism position shown at FIG. 2C, FIG. 2D, FIG. 3C and FIG. 3D. The belt guide mechanism 214 may then pivot downward from its raised belt guide mechanism position back to its intermediate belt guide mechanism position shown at FIG. 2E and FIG. 3E and back to its lowered position shown at FIG. 2A and FIG. 3A.

As shown at block 408, the method includes using a linkage assembly 224 coupled between belt guide mechanism 214 and shield 222 to pivot the shield 222 between a lower shield position and a raised shield position. For example, as shown at FIG. 2A through FIG. 2E and FIG. 3A through FIG. 3E, the linkage assembly 224 may cause the shield 222 to pivot upward from its shield position shown at FIG. 2A and FIG. 3A to its intermediate shield position shown at FIG. 2B and FIG. 3B and to its raised shield position shown at FIG. 2C, FIG. 2D, FIG. 3C and FIG. 3D. The shield 222 may then pivot downward from its raised shield position back to its intermediate shield position shown at FIG. 2E and FIG. 3E and back to its lowered shield position shown at FIG. 2A and FIG. 3A. The shield 222 may also be prevented from contacting the bale 208 shown in the position shown at FIG. 2E and FIG. 3E by causing a rear surface 236 of the shield 222 to be substantially parallel to a rear surface 238 of the sidewall 220 when the shield 222 is in a position between the raised position and the lowered position and proximate to the bale 208. Further, in some embodiments, the rear surface 236 of the shield 222 may be caused to remain substantially parallel to the rear surface 238 of the sidewall 220 as the shield 222 pivots between the raised position and the lowered position to prevent the shield 222 from contacting the bale 208 when the bale is in the position shown at FIG. 2E and FIG. 3E.

As shown at block 409, the method includes preventing the shield 222 from contacting the bale 208 ejected from the bale chamber. For example, in some embodiments, the cams 232, the cam track 230 and the linkage assembly 224 may together be configured to prevent the shield 222 from contacting the bale 208 when the shield is in the intermediate shown at FIG. 2E by causing rear surface 236 of the shield 222 to be substantially parallel to the rear surface 238 of the sidewall 220. In some embodiments, rear surface 236 of shield 222 may be caused to remain substantially parallel to the rear surface 238 of the sidewall 220 as the shield pivots between the raised position and the lowered position to prevent the shield 222 from contacting the bale 208 when the bale is in the position shown at FIG. 2E. In some aspects, as shown in the embodiment at FIG. 2A through FIG. 2E, the cam track 230 may be angled to prevent the shield 222 from contacting the bale 208 when the bale is in the position shown at FIG. 2E.

As shown at decision point 410, it may be determined whether a new bale 208 is to be formed in the bale chamber 204. If a new bale 208 is to be formed in the bale chamber 204, the method proceeds back to block 402 and the belt guide mechanism 214 and the shield 222 are pivoted back to the position shown at FIG. 2A or FIG. 3A so that one or more belts, such as belt 210, coupled to the belt guide mechanism 214 may facilitate the forming of the new bale 208 in the bale chamber 204. If a new bale 208 is not to be formed in the bale chamber 204, then the method ends at 412.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A baler comprising:
a baler frame;
a bale chamber configured to form a bale from bale material; and
a gate assembly comprising:
  a belt guide mechanism coupled to a side of the baler frame and guide one or more belts used to form the bale;
  a shield pivotably coupled to the side of the baler frame and configured to at least partially enclose with the frame at least one or more components of the baler in a lower shield position; and
  a linkage assembly coupled between the belt guide mechanism and the shield; and
wherein, the belt guide mechanism is configured to pivot between a lower belt guide mechanism position and a raised belt guide mechanism position to allow the bale to be ejected from the bale chamber, and
the linkage assembly is configured to pivot the shield between the lower shield position and a raised shield position responsive to the pivoting of the belt guide mechanism;
wherein the linkage assembly comprises:
  a shield support arm coupled between the shield and the baler frame; and
  a linkage arm coupled between the shield support arm and the belt guide mechanism.

2. The baler of claim 1, wherein
the gate assembly further comprises a second linkage arm coupled between the shield and the baler frame and spaced from the linkage arm, and
the second linkage arm is configured to prevent the shield from contacting the bale when the shield is pivoted.

3. The baler of claim 1, wherein the linkage assembly is configured to prevent the shield from contacting the bale when the shield is pivoted.

4. A baler comprising:
a baler frame;
a bale chamber configured to form a bale from bale material; and
a gate assembly comprising:
  a belt guide mechanism coupled to a side of the baler frame and guide one or more belts used to form the bale;
  a shield pivotably coupled to the side of the baler frame and configured to at least partially enclose with the frame at least one or more components of the baler in a lower shield position; and
  a linkage assembly coupled between the belt guide mechanism and the shield; and
wherein, the belt guide mechanism is configured to pivot between a lower belt guide mechanism position and a raised belt guide mechanism position to allow the bale to be ejected from the bale chamber, and
the linkage assembly is configured to pivot the shield between the lower shield position and a raised shield position responsive to the pivoting of the belt guide mechanism;
a cam track disposed on a surface of the shield; and
one or more cams disposed on a surface of the belt guide mechanism and configured to move along the cam track, and
the cams, the cam track and the linkage assembly are together configured to prevent the shield from contacting the bale when the shield is pivoted.

5. The baler of claim 4, wherein the shield comprises a surface facing a rear surface of the baler frame, and
the cams, the cam track and the linkage assembly are together configured to cause the surface of the shield facing the ejected bale to be substantially parallel to the rear surface of the baler frame when the shield is in a position between the raised position and the lowered position and proximate to the bale.

6. A baler comprising:
a baler frame;
a bale chamber configured to form a bale from bale material; and
a gate assembly comprising:
  a belt guide mechanism coupled to a side of the baler frame and guide one or more belts used to form the bale;
  a shield pivotably coupled to the side of the baler frame and configured to at least partially enclose with the frame at least one or more components of the baler in a lower shield position; and
  a linkage assembly coupled between the belt guide mechanism and the shield; and
wherein, the belt guide mechanism is configured to pivot between a lower belt guide mechanism position and a raised belt guide mechanism position to allow the bale to be ejected from the bale chamber, and the linkage assembly is configured to pivot the shield between the lower shield position and a raised shield position responsive to the pivoting of the belt guide mechanism;

wherein the gate assembly further comprises:
an additional belt guide mechanism on an opposing side of the baler spaced from the belt guide mechanism and rotatably coupled to an opposing side of the baler frame,
an additional linkage assembly coupled between the opposing belt guide mechanism and an opposing side of the shield; and wherein, the belt guide mechanism and the opposing belt guide mechanism are configured to pivot between respective lower belt guide mechanism positions and respective raised belt guide mechanism positions to allow the bale to exit the bale chamber, and the linkage assembly and the opposing linkage assembly are configured to pivot the shield between the lower shield position and the raised shield position responsive to the pivoting of the belt guide mechanism and the opposing belt guide mechanism.

7. A baler comprising:
a baler frame;
a bale chamber configured to form a bale from bale material; and
a gate assembly comprising:
a belt guide mechanism coupled to a side of the baler frame and guide one or more belts used to form the bale;
a shield pivotably coupled to the side of the baler frame and configured to at least partially enclose with the frame at least one or more components of the baler in a lower shield position; and
a linkage assembly coupled between the belt guide mechanism and the shield; and
wherein, the belt guide mechanism is configured to pivot between a lower belt guide mechanism position and a raised belt guide mechanism position to allow the bale to be ejected from the bale chamber, and
the linkage assembly is configured to pivot the shield between the lower shield position and a raised shield position responsive to the pivoting of the belt guide mechanism;
one or more rotatable belt rolls coupled between the belt guide mechanism and an additional belt guide mechanism on an opposing side of the baler from the belt guide mechanism, and
the linkage assembly and an additional linkage assembly on the opposing side of the baler are configured to cause the shield to limit operator contact of the one or more belts and the one or more belt rolls when the shield is pivoted between the lower shield position and the raised shield position.

8. The baler of claim 1, wherein the gate assembly further comprises a sidewall fixed to the baler frame,
the belt guide mechanism and the shield are pivotably coupled to the sidewall and the linkage assembly is coupled between the belt guide mechanism and the shield.

9. A gate assembly for use with a baler comprising,
a belt guide mechanism couplable to a side of a baler frame and configured to guide one or more belts used to form a bale;
a shield pivotably couplable to the side of the baler frame and configured to limit contact with one or more components of the baler; and
a linkage assembly coupled between the belt guide mechanism and the shield;
wherein, the belt guide mechanism is configured to pivot between a lower belt guide mechanism position and a raised belt guide mechanism position to allow the bale to be ejected from the bale chamber, and
the linkage assembly is configured to pivot the shield between a lower shield position and a raised shield position responsive to the pivoting of the belt guide mechanism; and
wherein the linkage assembly comprises:
a shield support arm coupled between the shield and the baler frame; and
a linkage arm coupled between the shield support arm and the belt guide mechanism.

10. The gate assembly of claim 9, further comprising a second linkage arm coupled between the shield and the baler frame and spaced from the linkage arm,
wherein the second linkage arm is configured to prevent the shield from contacting the bale when the shield is pivoted.

11. The gate assembly of claim 9, wherein the linkage assembly is configured to prevent the shield from contacting the bale when the shield is pivoted.

12. The gate assembly of claim 9, wherein the belt guide mechanism comprises:
a belt guide arm extending from a pivoting end to a distal end; and
a belt roll holding portion extending in opposing directions from the distal end of the belt guide arm.

13. A gate assembly for use with a baler comprising,
a belt guide mechanism couplable to a side of a baler frame and configured to guide one or more belts used to form a bale;
a shield pivotably couplable to the side of the baler frame and configured to limit contact with one or more components of the baler; and
a linkage assembly coupled between the belt guide mechanism and the shield;
wherein, the belt guide mechanism is configured to pivot between a lower belt guide mechanism position and a raised belt guide mechanism position to allow the bale to be ejected from the bale chamber, and
the linkage assembly is configured to pivot the shield between a lower shield position and a raised shield position responsive to the pivoting of the belt guide mechanism;
a cam track disposed on a surface of the shield; and
one or more cams disposed on a surface of the belt roll holding portion and configured to move along the cam track, and
the cams, the cam track and the linkage assembly are together configured to prevent the shield from contacting the bale when the shield is pivoted.

14. The gate assembly of claim 13, wherein the shield comprises a surface facing a rear surface of the baler frame, and
the cams, the cam track and the linkage assembly are together configured to cause the surface of the shield facing the ejected bale to be substantially parallel to the rear surface of the baler frame when the shield is in a position between the raised position and the lowered position and proximate to the bale.

15. The gate assembly of claim 9, wherein the gate assembly further comprises a sidewall fixed to the baler frame, the belt guide mechanism and the shield are pivotably coupled to the sidewall and the linkage assembly is coupled between the belt guide mechanism and the shield.

16. The gate assembly of claim 15, wherein the gate assembly further comprises:
   an opposing sidewall spaced from the sidewall and fixed to the baler frame;
   an additional belt guide mechanism spaced from the belt guide mechanism on an opposing side of the assembly and pivotably coupled to the opposing sidewall,
   an additional linkage assembly on the opposing side coupled between the additional belt guide mechanism and an opposing side of the shield; and
   wherein, the belt guide mechanism and the additional belt guide mechanism are configured to pivot between respective lower belt guide mechanism positions and respective raised belt guide mechanism positions to allow the bale to be ejected from the bale chamber, and
   the linkage assembly and the additional linkage assembly are configured to pivot the shield between the lower shield position and the raised shield position responsive to the pivoting of the belt guide mechanism and the additional belt guide mechanism.

* * * * *